(12) United States Patent
Kim

(10) Patent No.: US 10,287,931 B2
(45) Date of Patent: May 14, 2019

(54) EMBEDDED-COMPONENT-TYPE ACTUATOR AND CONTINUOUSLY VARIABLE VALVE DURATION SYSTEM, AND VALVE TRAIN SYSTEM FORMED THEREBY

(71) Applicant: HYUNDAI KEFICO CORPORATION, Gunpo, Gyeonggi-do (KR)

(72) Inventor: Lae-Kyeom Kim, Gangwon-do (KR)

(73) Assignee: HYUNDAI KEFICO CORPORATION, Gunpo, Gyeonggi-do (KR)

( * ) Notice: Subject to any disclaimer, the term of this patent is extended or adjusted under 35 U.S.C. 154(b) by 64 days.

(21) Appl. No.: 15/634,443

(22) Filed: Jun. 27, 2017

(65) Prior Publication Data
US 2018/0003089 A1    Jan. 4, 2018

(30) Foreign Application Priority Data
Jul. 4, 2016 (KR) .................. 10-2016-0084194

(51) Int. Cl.
| | | |
|---|---|---|
| F01L 1/34 | (2006.01) |
| H02K 11/21 | (2016.01) |
| F01L 1/047 | (2006.01) |
| F16H 1/28 | (2006.01) |
| F16H 57/02 | (2012.01) |

(Continued)

(52) U.S. Cl.
CPC .............. *F01L 1/344* (2013.01); *F01L 1/047* (2013.01); *F01L 13/0015* (2013.01); *F16H 1/28* (2013.01);
(Continued)

(58) Field of Classification Search
CPC ....... F01L 1/344; F01L 13/0015; F01L 1/047; F01L 1/053; F01L 2013/103; G05D 3/20;
(Continued)

(56) References Cited

U.S. PATENT DOCUMENTS 5,680,837 A * 10/1997 Pierik ..................... F01L 1/352
123/90.17
6,129,061 A * 10/2000 Okuda .................... F01L 1/352
123/90.17

(Continued)

FOREIGN PATENT DOCUMENTS

JP    2005-273507 A    10/2005
KR    10-2012-0131404 A    12/2012
(Continued)

*Primary Examiner* — Mark A Laurenzi
*Assistant Examiner* — Wesley G Harris
(74) *Attorney, Agent, or Firm* — Mintz Levin Cohn Ferris Glovsky and Popeo, P.C.; Kongsik Kim; Jhongwoo Jay Peck

(57) ABSTRACT

An embedded-component-type actuator is provided. The actuator includes an output shaft that is rotated, a planetary gear set that forms an overlapping section coaxially with the output shaft, and a motor that is coupled to the overlapping section of the planetary gear set. A sensing controller detects a rotation angle of the output shaft. The output shaft passes an actuator housing and the planetary gear set, the motor, and the sensing controller are arranged in series, thus minimizing a package. Additionally, the actuator is applied as the power source of a CVVD system to improve mountability to a complex engine room due to the space occupancy minimization.

17 Claims, 5 Drawing Sheets

(51) Int. Cl.
*H02K 7/116* (2006.01)
*F01L 13/00* (2006.01)
*F01L 1/053* (2006.01)
*F01L 1/344* (2006.01)
*H02K 11/215* (2016.01)
*G05D 3/20* (2006.01)

(52) U.S. Cl.
CPC .............. *F16H 57/02* (2013.01); *G05D 3/20* (2013.01); *H02K 7/116* (2013.01); *H02K 11/215* (2016.01); *F01L 1/053* (2013.01); *F01L 2013/103* (2013.01); *F16H 2057/02034* (2013.01); *F16H 2057/02082* (2013.01)

(58) Field of Classification Search
CPC .. F16H 1/28; F16H 57/02; F16H 2057/02034; F16H 2057/02082; H02K 11/215; H02K 7/116
See application file for complete search history.

(56) References Cited

U.S. PATENT DOCUMENTS

| | | | | |
|---|---|---|---|---|
| 6,563,246 | B1 * | 5/2003 | Kajiura | B60K 6/26 310/114 |
| 6,791,219 | B1 * | 9/2004 | Eric | H02K 29/08 310/68 B |
| 2004/0108778 | A1 * | 6/2004 | Tsukamoto | H02K 7/116 310/83 |
| 2006/0019786 | A1 * | 1/2006 | Asa | F01C 17/02 475/5 |
| 2012/0074820 | A1 * | 3/2012 | Takeuchi | H02K 7/116 310/75 R |

FOREIGN PATENT DOCUMENTS

| | | | | |
|---|---|---|---|---|
| WO | 2009/001399 A1 | 12/2008 | | |
| WO | WO-2011122641 A1 * | 10/2011 | ............... | B60B 7/00 |

* cited by examiner

ENLARGED VIEW OF AREA M

EMBEDDED-COMPONENT-TYPE ACTUATOR AND CONTINUOUSLY VARIABLE VALVE DURATION SYSTEM, AND VALVE TRAIN SYSTEM FORMED THEREBY

CROSS REFERENCE TO RELATED APPLICATION(S)

This application claims the benefit of Korean Patent Application No. 10-2016-0084194, filed Jul. 4, 2016, which is hereby incorporated by reference in its entirety into this application.

BACKGROUND OF THE INVENTION

1. Technical Field

The present invention relates generally to an actuator, and more particularly, to an embedded-component-type actuator and a continuously variable valve duration system, and a valve train system formed thereby, in which the package of the system is optimized.

2. Description of the Related Art

Generally, an actuator, to which a motor and a reducer are applied in separate states for power transmission, is suitable for vehicle system control such as continuously variable valve timing (hereinafter, referred to as CVVT) or continuously variable valve duration (hereinafter, referred to as CVVD). The CVVT system simultaneously changes the timing of an intake valve and or an exhaust valve while the valve duration is fixed, thereby improving system responsiveness and extending the cam operating range. Thus, a CVVT actuator for the CVVT system directly controls a cam shaft.

Further, the CVVD system defines the short-side as a start angle and the long-side as a maximum rotation angle by dividing one-rotation region of 360° into predetermined regions, and detects valve duration control, which varies with start shaft position duration and end shaft position duration based on the operating state of the engine. Thus, a CVVD actuator for the CVVD system directly operates a control shaft that is rotated from the start shaft position to the end shaft position in conjunction with a valve lifter to change a rotational speed of the cam shaft. Particularly, the CVVD actuator further includes a position sensor disposed in an engine head assembly that is provided with a cam shaft and a valve train, and the position of the control shaft detected by the position sensor is transmitted to an engine electronic control unit (ECU) and used to calculate the valve duration value and then output to a CVVD controller.

However, the CVVD actuator has a structure that is disadvantageous in regards package minimization. One is the internal factor due to the separate structure of the motor and reducer, and the other is the external factor due to the external structure of the position sensor and the CVVD controller. These two factors increase the space occupancy of the CVVD actuator to the surrounding space of the engine head assembly, which limits the degree of freedom in engine room design and, in particular, may require changing the engine room layout.

The foregoing is intended merely to aid in the understanding of the background of the present invention, and is not intended to mean that the present invention falls within the purview of the related art that is already known to those skilled in the art.

SUMMARY

Accordingly, the present invention provides an embedded-component-type actuator and a continuously variable valve duration system formed thereby, in which a reducer is arranged coaxially with a motor, and a magnet and a controller are integrated in a space of an actuator housing by the printed circuit board assembly (PCBA), thereby eliminating both internal and external factors which are obstacles to package minimization.

In order to achieve the above object, according to an aspect of the present invention, an actuator may include: a planetary gear set that forms an overlapping section with an output shaft being rotated; a motor that forms a concentric section coupled to the overlapping section to be arranged in series with the planetary gear set, and forms a fixed section with the output shaft; a sensing controller configured to detect a rotation angle of the output shaft behind the motor; a housing bracket abutting the planetary gear set with the output shaft passing therethrough; and a housing cover coupled to the motor.

According to an exemplary embodiment, the output shaft may include a shaft carrier with a connection shaft that outputs output power and a concentric shaft connected to the connection shaft and forming the overlapping section and the fixed section are separated by a carrier flange; the planetary gear set may include a sun gear that forms a hollow sun gear shaft with the concentric shaft passing therethrough, planetary gears circumscribed about the sun gear, carrier pins that hold the planetary gears to the carrier flange, and a ring gear with the planetary gears inscribed therein; the motor may include a rotor that forms the concentric section by the sun gear shaft passing therethrough, a stator that encloses the rotor, and a motor housing that encloses the stator and forms both the concentric shaft and the fixed section; and the sensing controller may include a magnet coupled to the concentric shaft, and a PCBA configured to detect a position of the magnet.

According to an exemplary embodiment, the concentric shaft may include an insert shaft and a sensor end shaft; the insert shaft forms the overlapping section by passing through the sun gear shaft; the sensor end shaft forms the fixed section, along with an end boss that protrudes on a side of the motor housing, over the overlapping section, and locks the magnet; a needle bearing may be interposed between the insert shaft and the sun gear shaft; and a bearing may be interposed between the sensor end shaft and the end boss. Additionally, the housing bracket may be formed with a double-stepped surface with the carrier flange and a bearing respectively disposed thereon, and the housing cover may be formed with an inner space with the magnet and the PCBA disposed therein.

Furthermore, according to another aspect of the present invention, a continuously variable valve duration system may include: a CVVD actuator that has an output shaft being rotated, a planetary gear set that forms an overlapping section with the output shaft being a concentric shaft, a motor coupled to the overlapping section of the planetary gear set to be disposed behind the planetary gear set, a sensing controller configured to detect a rotation angle of the output shaft behind the motor, a housing bracket with the output shaft passing therethrough and the planetary gear set coupled thereto, and a housing cover coupled to the motor to accommodate the sensing controller; a control shaft connected to the actuator, and rotated from a start shaft position to an end shaft position or from the end shaft position to the start shaft position as an operating angle of the actuator; and a valve lifter configured to adjust a rotational speed of a cam shaft by the control shaft moving the valve lifter. According to an exemplary embodiment, feedback data for adjusting an output signal of the engine ECU is provided by detecting the operating angle as a rotation angle of the output shaft.

Further, according to yet another aspect of the present invention, a valve train system may include: a continuously variable valve duration (CVVD) system configured to change a rotational speed of a cam shaft using a CVVD actuator as a power source, the CVVD actuator having an output shaft being rotated, a planetary gear set that forms an overlapping section with the output shaft being a concentric shaft, a motor coupled to the overlapping section of the planetary gear set to be disposed behind the planetary gear set, a sensing controller configured to detect a rotation angle of the output shaft behind the motor, a housing bracket with the output shaft passing therethrough and the planetary gear set coupled thereto, and a housing cover coupled to the motor to accommodate the sensing controller.

According to an exemplary embodiment, the CVVD system may further include a continuously variable valve timing (CVVT) system using a CVVT actuator directly operating the cam shaft, as a power source. The actuator of the present invention may include a reducer, a motor, a magnet, and a controller implemented as embedded components integrated in an inner space, thereby having the following advantages and effects.

First, the separator structure of the reducer and the motor is converted into an integral type, whereby it is possible to eliminate the internal factor. Second, the integral structure of the reducer and motor is achieved by coaxial arrangement for the output shaft, whereby it is possible to minimize design changes to minimize the package. Third, the magnet and the controller are embedded in the inner space of the actuator in conjunction with the output shaft, whereby it is possible to eliminate the external factor which is another obstacle to minimizing the actuator's package. Fourth, the magnet and the controller are integrated using the PCBA, whereby it is possible to minimize component increase due to elimination of the external factor. Fifth, the existing internal factor and external factor are simultaneously eliminated, reducing the total length of the actuator, whereby it is possible to achieve more effective package minimization. Sixth, the actuator is converted into a component-embedded type, whereby it is possible to facilitate handling and management of the actuator.

Further, the CVVD system of the present invention is advantageous in that an embedded-component-type actuator is applied thereto, whereby it is possible to minimize space occupancy for a surrounding space of the engine head assembly, which limits the degree of freedom in engine room design. The CVVD system of the present invention is also advantageous in that it is possible to minimize space occupancy of an embedded-component-type actuator in an engine room. Additionally, the valve train system of the present invention is advantageous in that it is constituted by the CVVD system and CVVT system, to which an embedded-component-type actuator is applied, whereby it is more easily applied to the engine room without affecting the existing engine room layout.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
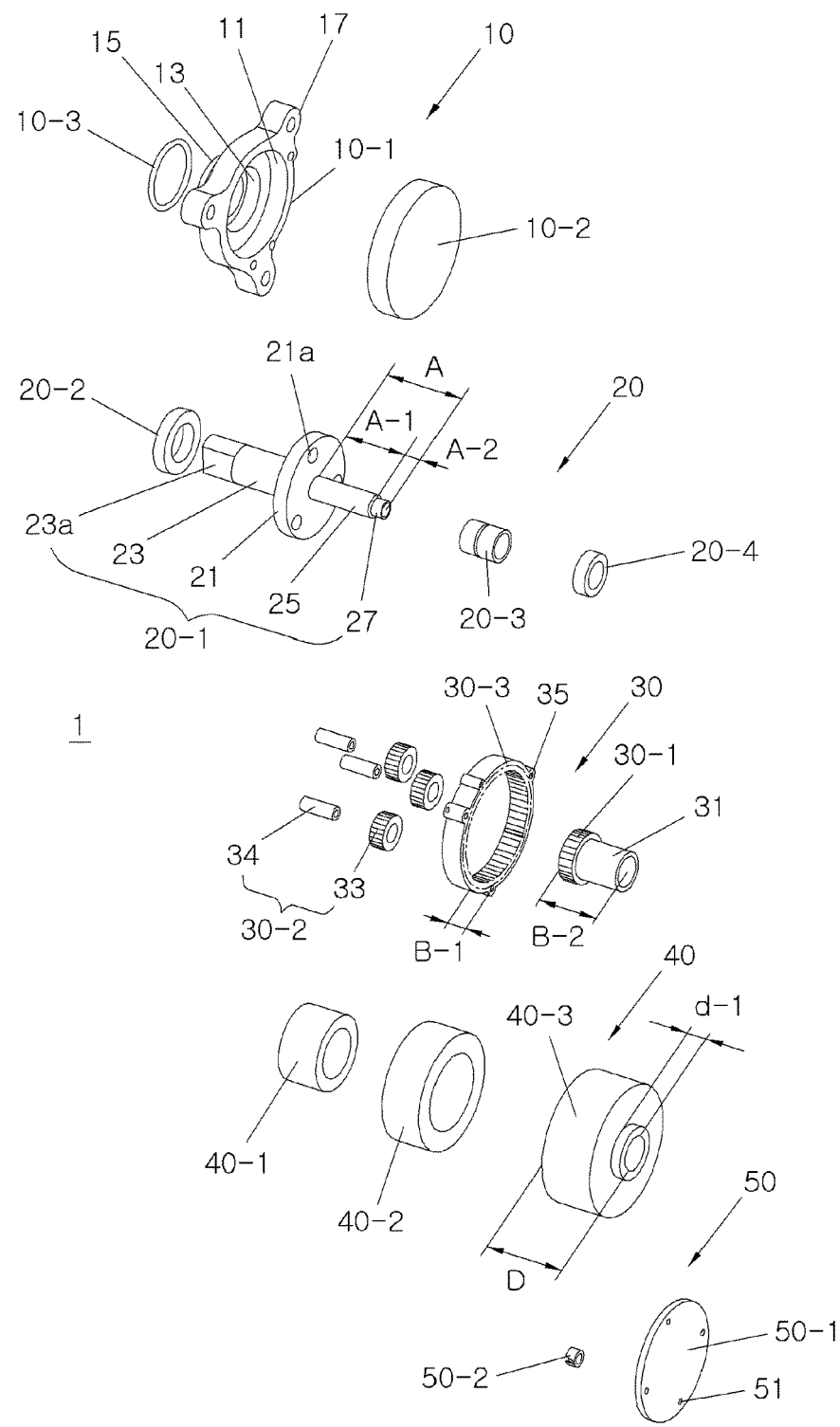
FIG. 1 shows an assembled sectional view of an embedded-component-type actuator according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinbelow, an exemplary embodiment of the present invention will be described in detail with reference to the accompanying drawings. Throughout the drawings, the same reference numerals will refer to the same or like parts.

Referring to FIG. 1, an actuator 1 may include an actuator housing 10, an output shaft 20, a planetary gear set 30, a motor 40, and a sensing controller 50, and is in the form of an embedded-component-type actuator using the actuator housing 10. Specifically, the actuator housing 10 may include a housing bracket 10-1, a housing cover 10-2, and an O-ring 10-3. The housing bracket 10-1 is in a form of a bracket body formed with a plurality of locking apertures while forming a one-way open space, in which a hollow shaft boss 15 formed with a shaft bore protrudes to one side, whereby the output shaft 20 passes therethrough and the planetary gear set 30 is held thereto. Particularly, in an inner space of the bracket body, both a small-diameter stepped surface 13 that forms a concentric circle with the shaft bore and a large-diameter stepped surface 11 that forms a concentric circle with the small-diameter stepped surface 13 are grooved to form an open space, thereby holding an assembly position of the output shaft 20.

Further, the bracket body may be formed with three fixed bosses 17 that protrude at intervals of about 120 degrees on an outer circumferential surface thereof, thereby forming a fastening portion of the actuator 1. The housing cover 10-2 includes a cover body formed with a one-way open space, and may be coupled to the motor 40 with the sensing controller 50 accommodated in the one-way open space. The O-ring 10-3 may be fitted over a groove formed on an outer circumferential surface of the hollow shaft boss 15 to be integrated with the actuator housing 10.

Specifically, the output shaft 20 may include a shaft carrier 20-1, a front bearing 20-2, a needle bearing 20-3, and a rear bearing 20-4. The shaft carrier 20-1 may include: a carrier flange 21 with three pin holes 21a formed therethrough at intervals of about 120 degrees; a connection shaft 23 having a quadrangular cross-section insert end 23a, and protruding from a first side of the carrier flange 21; and a concentric shaft protruding from a second side of the carrier flange 21. The concentric shaft may include an insert shaft 25 and a hollow sensor end shaft 27.

Hereinafter, a length of the insert shaft 25 is defined as A-1, a length of the sensor end shaft 27 is defined as A-2, and a length of the concentric shaft is defined as A (A-1+A-2). The front bearing 20-2 may be engaged with the connection shaft 23 to be engaged with the small-diameter stepped surface 13 of the housing bracket 10-1. The needle bearing 20-3 may be engaged with the insert shaft 25 to be integrated with the shaft carrier 20-1. The rear bearing 20-4 is engaged with the sensor end shaft 27 to be integrated with the shaft carrier 20-1.

In particular, the planetary gear set 30 may include a sun gear 30-1, a carrier 30-2, and a ring gear 30-3. The sun gear 30-1 may include a hollow sun gear shaft 31 with a shaft bore formed therethrough. Hereinafter, a length of the sun gear shaft 31 is defined as B-2. The carrier 30-2 may include three planetary gears 33 fastened by three carrier pins 34, and circumscribes the sun gear 30-1. The ring gear 30-3 may be in a form of an annular ring gear body, in which the planetary gears 33 are inscribed in an inner circumferential surface thereof, and fixed bosses 35 with locking apertures formed therethrough may be arranged at intervals of 120 degrees on an outer circumferential surface of the ring gear body. Hereinafter, a width of the ring gear 30-3 is defined as B-1.

Further, the motor 40 may include a rotor 40-1, a stator 40-2, and a motor housing 40-3. The rotor 40-1 may include a rotor body having a plurality of rotor components, wherein a center of the rotor body may be formed with a shaft bore. The stator 40-2 may include a stator body having a plurality of stator components, wherein a center of the stator body may be formed with a shaft bore. The motor housing 40-3 may include a motor housing body that forms a one-way open space, wherein the motor housing body is formed with a bearing seating space and an end boss 41 having a shaft bore with a small diameter at one side thereof.

Hereinafter, a width of the motor housing 40-3 is defined as D, and a length of the end boss 41 is defined as d-1. Further, the sensing controller 50 may include a PCBA 50-1, and a magnet 50-2. The PCBA 50-1 is provided with a wiring pattern for signal processing, and a Hall IC, and may be formed in a disk shape with a plurality of locking apertures 51 formed therethrough. The magnet 50-2 may be in a form of an annular magnet.

Figure 2:
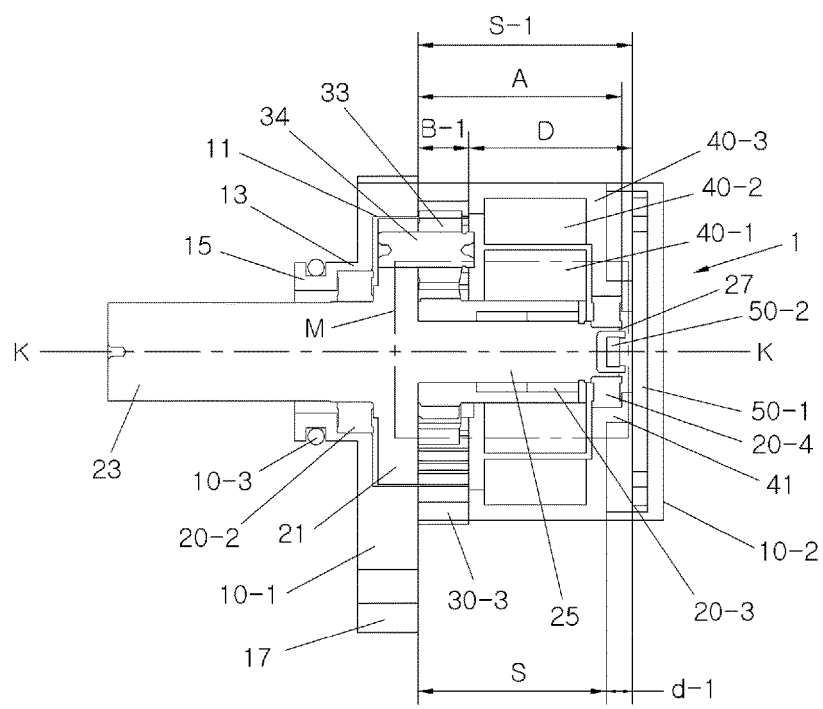
FIG. 2 shows a detailed view of the embedded-component-type actuator according to an exemplary embodiment of the present invention.
Figure 2:
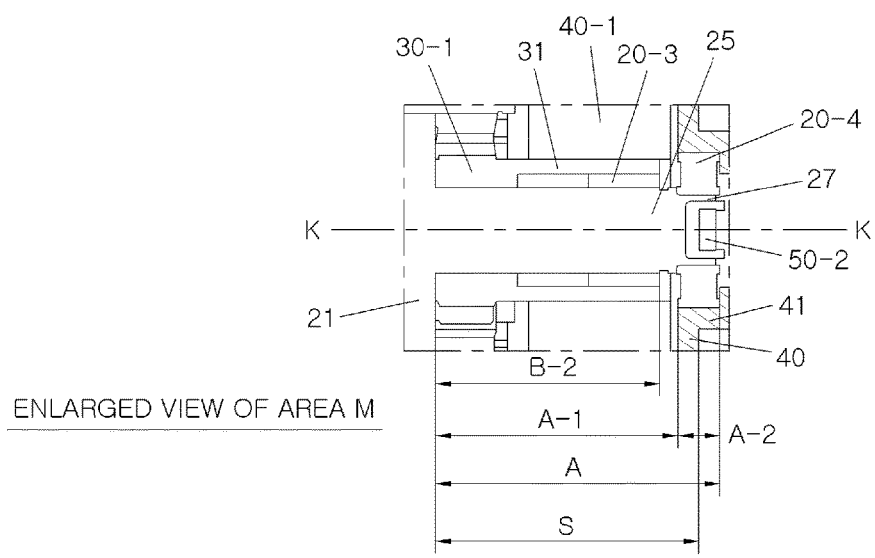

Referring to FIG. 2, the embedded-component-type actuator 1 provides a series arrangement of the planetary gear set 30, the motor 40, and the sensing controller 50, which are arranged coaxially with the output shaft 20, without a direct fastening structure between the housing bracket 10-1 and the housing cover 10-2. For example, not shown in the drawings, the housing bracket 10-1, the ring gear 30-3, the motor housing 40-3, and the housing cover 10-2 may be fixed by bolt fastening or clip fastening or by press fitting, as known for actuator assemblies.

Specifically, the shaft carrier 20-1 may be assembled in the following manner: the connection shaft 23 is inserted in the hollow shaft boss 15 of the housing bracket 10-1; the front bearing 20-2 is disposed on the small-diameter stepped surface 13 of the housing bracket 10-1 to be assembled with the housing bracket 10-1; the carrier flange 21 is disposed on the large-diameter stepped surface 11 of the housing bracket 10-1 to be assembled with the planetary gear set 30; the concentric shaft 25 having passed through the planetary gear set 30 is assembled with the planetary gear set 30 through the needle bearing 20-3; and the sensor end shaft 27 having passed through the motor 40 is assembled with the motor 40 through the rear bearing 20-4. Accordingly, the output shaft 20 may provide an overlapping section by being arranged coaxially with the insert shaft 25 and the planetary gear set 30, and a concentric section by being arranged coaxially with the insert shaft 25, the planetary gear set 30, and the motor 40, thereby serving as an element for minimizing the actuator package.

Furthermore, the sun gear 30-1 may be inserted in the concentric shaft 25 of the shaft carrier 20-1 using the sun gear shaft 31; each of the carrier pins 34 may be fitted in each of the pin holes 21a formed in the carrier flange 21 of the shaft carrier 20-1; each of the planetary gears 33 may be inscribed in the ring gear 30-3 by being held by the carrier pins 34; and the ring gear 30-3 may be engaged with the locking aperture formed through bracket body of the housing bracket 10-1 using locking pins (not shown) fitted in the fixed boss 35. Accordingly, the planetary gear set 30 provides an overlapping section by the sun gear 30-1 being arranged coaxially with the insert shaft 25 of the shaft carrier 20-1, thereby serving as an element for minimizing the actuator package.

Additionally, the rotor 40-1 may be fitted over the sun gear shaft 31 of the sun gear 30-1 using the shaft bore; the stator 40-2 may be fitted over the rotor 40-1 using the shaft bore; the motor housing 40-3 may be coupled to the stator 40-2 fitted over the rotor 40-1 using the one-way open space; and the end boss 41 supports the sensor end shaft 27 of the shaft carrier 20-1 disposed in the shaft bore using the rear bearing 20-4 seated in the bearing seating space. Accordingly, the motor 40 provides a concentric section by the rotor 40-1 being arranged coaxially with the insert shaft 25 and the sun gear shaft 31, thereby serving as an element for minimizing the actuator package. Further, in the motor 40, the rear bearing 20-4 may be locked to the end boss 41 of the motor housing 40-3, thereby being locked to the shaft carrier 20-1 through the sensor end shaft 27 engaged with the rear bearing 20-4.

In particular, the PCBA 50-1 may be inserted in the one-way open space of the housing cover 10-2 to be integrated with the housing cover 10-2, and the magnet 50-2 may be fitted in the sensor end shaft 27 of the shaft carrier 20-1 to be integrated with the output shaft 20. As a result, a layout of the actuator 1 is as follows. The length A of the concentric shaft of the output shaft 20, the length B-2 of the sun gear shaft 31, and the length S-1 of the serial array of the planetary gear set 30 and the motor 40 are defined as shown in Equations 1, 2, and 3, respectively below.

$$A = A\text{-}1 + A\text{-}2 \qquad \text{Equation 1}$$

$$A\text{-}1 > B\text{-}2 \qquad \text{Equation 2}$$

$$S\text{-}1 = B\text{-}1 + D \qquad \text{Equation 3}$$

wherein, A-1 refers to the length of the insert shaft 25, A-2 refers to the length of the sensor end shaft 27, B-1 refers to the width of the ring gear 30-3, D refers to the width of the motor housing 40-3, and d-1 refers to the length of the end boss 41, respectively. Further, ">" is a sign of inequality representing relative size of two values.

Accordingly, the length B-2 of the sun gear shaft 31 is less than the length A-1 of the insert shaft 25, and the length A of the concentric shaft of the output shaft 20 has a dimension that is less than the length S-1 of the serial array of the planetary gear set 30 and the motor 40. As a result, the planetary gear set 30 and the motor 40 form the overlapping section by being arranged coaxially with the length A of the concentric shaft of the output shaft 20. Accordingly, the actuator 1 enables package minimization using the overlapping section compared to existing separate arrangement manner without overlapping section. Further, an exposure length S of the planetary gear set 30 and the motor 40 is defined as shown below in Equation 4.

$$S = S\text{-}1 - d\text{-}1 \qquad \text{Equation 4}$$

wherein, S-1 refers to the length of the housing cover 10-2.

The length d-1 of the end boss 41 overlaps with the housing cover 10-2 to form a dead space that is not exposed to the outside, and thus, the exposure length S of the planetary gear set 30 and the motor 40 is reduced to a length of the length A of the concentric shaft of the output shaft 20 plus a thickness of the motor housing 40-3. Therefore, a total length of the actuator 1 is reduced accordingly. The actuator 1 thus enables package minimization due to reduction of the total length.

Figure 3:
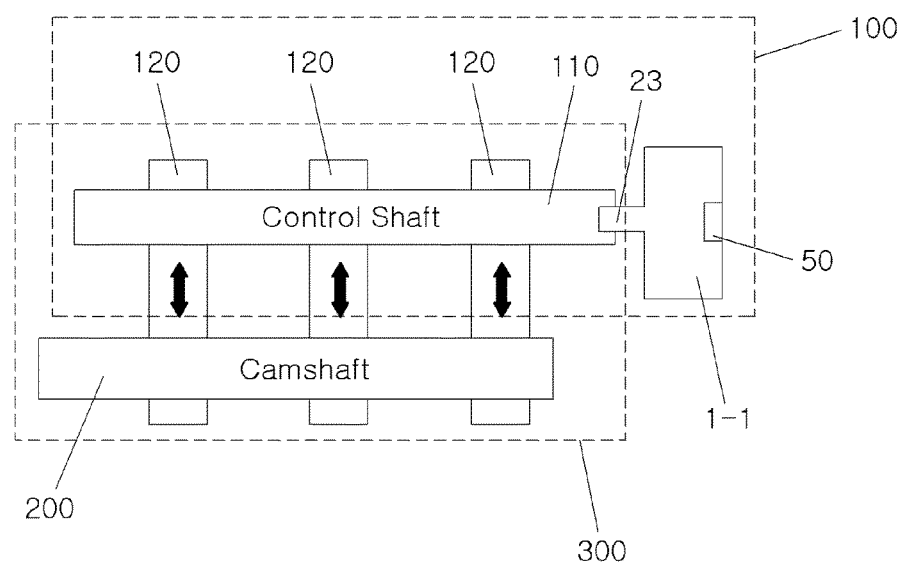
FIG. 3 shows a diagram of a continuously variable valve duration system with the embedded-component-type actuator according to an exemplary embodiment of the present invention applied thereto.
Figure 4:
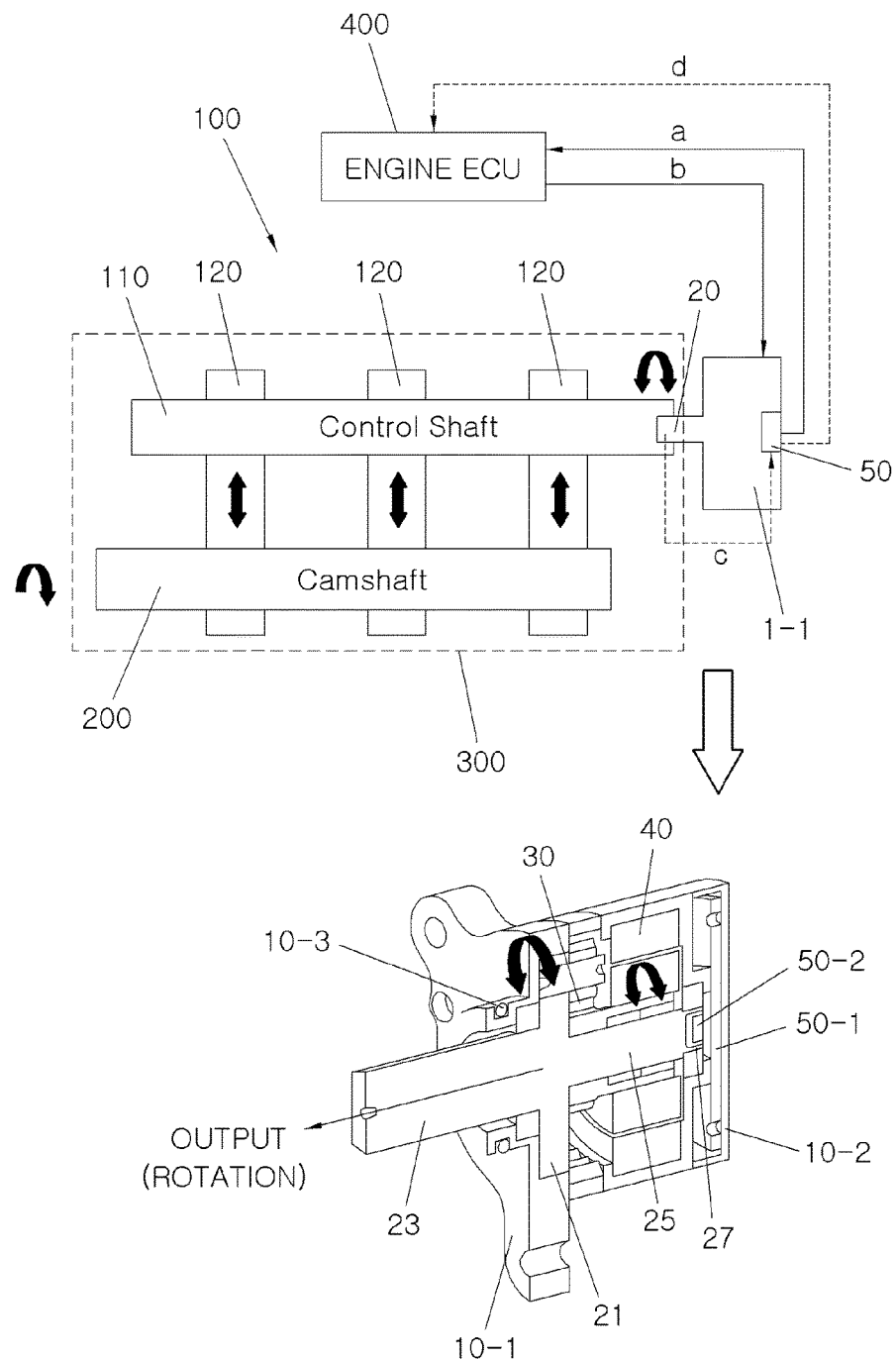
FIG. 4 shows an operational view of the continuously variable valve duration system with the embedded-component-type actuator according to an exemplary embodiment of the present invention applied thereto.

Meanwhile, FIGS. 3 and 4 show a continuously variable valve duration (CVVD) system 100 according to an exemplary embodiment of the present invention. Referring to FIG. 3, the CVVD system 100 may include a CVVD actuator 1-1, a control shaft 110, a valve lifter 120 configured to adjust a rotational speed of a cam shaft 200 and mounted to an engine head assembly 300.

In particular, the CVVD actuator 1-1 is the same component as the actuator 1 described through FIGS. 1 and 2. Thus, the CVVD actuator 1-1 minimizes space occupancy for a surrounding space of the engine head assembly 300 due to the package minimization by the overlapping section and reduction of the total length. Instead of an external position sensor configured to detect a rotation angle of the control shaft 110, the embedded sensing controller 50 may be configured to detect a rotation angle of the output shaft 20 applied to the CVVD actuator 1-1, thereby further minimizing size of the engine head assembly 300.

The control shaft 110 may be connected to the CVVD actuator 1-1 via the connection shaft 23 provided with the insert end 23a, thereby being rotated from a start shaft position to an end shaft position. The valve lifter 120 may be configured to adjust the rotational speed of the cam shaft 200 in conjunction with the rotation of the control shaft 110. Thus, the control shaft 110 and the valve lifter 120 are typical components of a general CVVD system.

Referring to FIG. 4, the CVVD actuator 1-1 may be operated by feedback control in conjunction with an engine ECU 400. Specifically, the engine ECU 400 may be configured to receive an output shaft position signal a from the PCBA 50-1 having detected the magnet 50-2 of the sensor end shaft 27, calculate an operating angle within an angle range with the start shaft position as a start angle and the end shaft position as a maximum rotation angle by dividing one-rotation region of 360° into predetermined regions using engine data along with the output shaft position signal a, and configured to output the result as an actuator control signal b.

Then, the rotation of the rotor 40-1 by power supply of the motor 40 may be transmitted to the planetary gears 33 via the sun gear 31, thereby rotating the output shaft 20. The rotation of the output shaft 20 may be transmitted to the control shaft 100 via the connection shaft 23; and the rotation of the control shaft 100 moves the valve lifter 120, thereby adjusting the rotational speed of the cam shaft 200. The PCBA 50-1 may then be configured to detect a position change c based on the rotation of the magnet 50-2, and transmit the position change c as an operating angle feedback signal d to the engine ECU 400, whereby the accuracy of the CVVD actuator 1-1 may be determined in the engine ECU 400. As a result, the CVVD actuator 1-1 may be feedback-controlled by the engine ECU 400 based on the signal.

Figure 5:
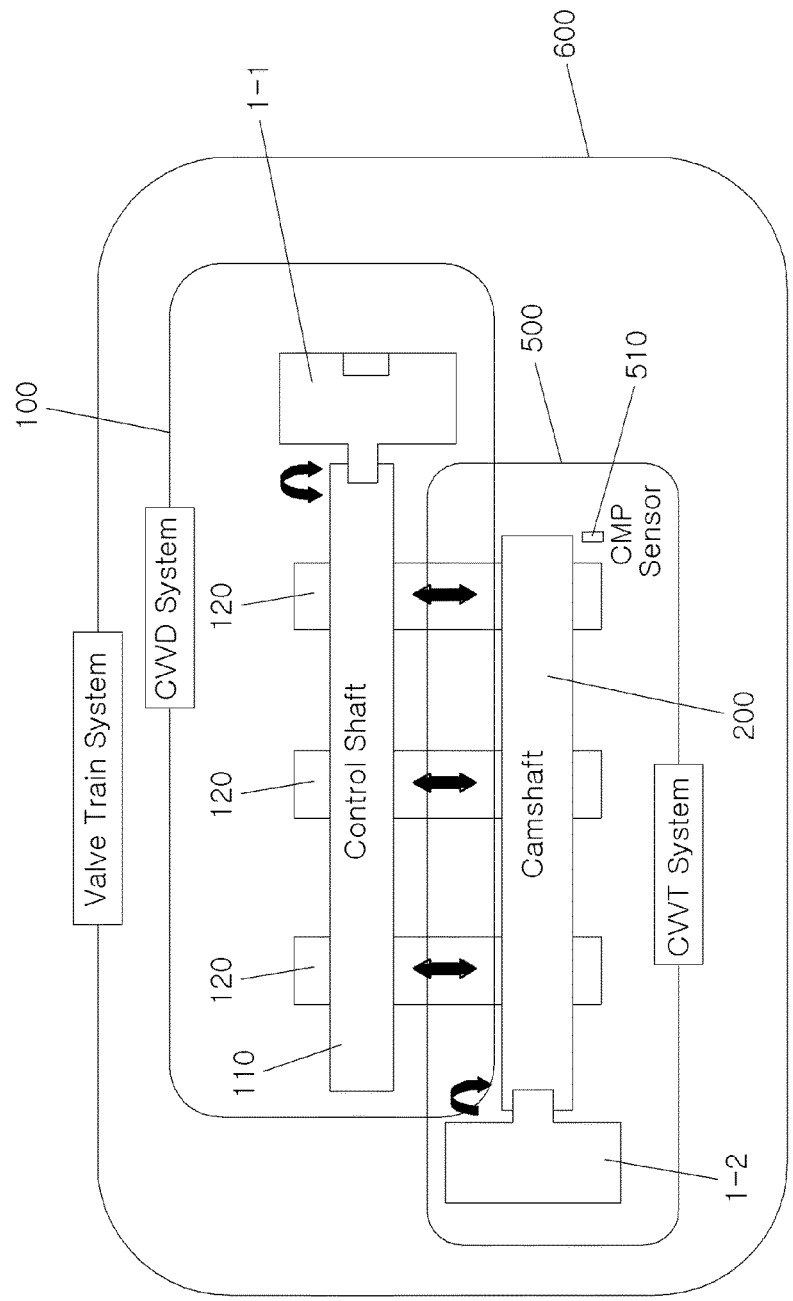
FIG. 5 shows an example of a valve train system constituted by the continuously variable valve duration system with the embedded-component-type actuator according to an exemplary embodiment of the present invention applied thereto.

Meanwhile, referring to FIG. 5, a valve train system 60 applied to a vehicle may include the CVVD system 100 and a continuously variable valve timing (CVVT) system 500. In particular, the CVVD system 100 may include the CVVD actuator 1-1, the control shaft 110, and the valve lifter 120 configured to adjust the rotational speed of the cam shaft 200. Thus, the CVVD system 100 is the same as the CVVD system 100 described through FIGS. 3 and 4. Specifically, the CVVT system 500 may include: a CVVT actuator 1-2 directly connected to the cam shaft 200; and the CVVT system 500 in conjunction with a cam shaft position (CMP) sensor 510 configured to detect a rotation angle of the cam shaft 200. Thus, the CVVT system 500 is a typical component of a general CVVT system.

Herein, the CVVT system 500 may include the embedded-component-type actuator 1 described through FIGS. 1 and 2, instead of the CVVT actuator 1-2. In particular, the CVVT system 500 may minimize space occupancy for a surrounding space of the valve train system 60 due to the package minimization provided by the embedded-component-type actuator 1. Accordingly, the valve train system 60 may substantially improve mountability in an engine room due to the space occupancy minimization provided by the CVVD system 100 and the CVVT system 500.

As described above, the embedded-component-type actuator 1 according to the exemplary embodiment may include: the output shaft 20 being rotated; the planetary gear set 30 that forms the overlapping section coaxially with the output shaft 20; the motor 40 coupled to the overlapping section of the planetary gear set 30; the sensing controller 50 configured to detect the rotation angle of the output shaft 20; and the actuator housing 10 with the output shaft 20 that passes therethrough, and the planetary gear set 30, the motor 40, and the sensing controller 50 may be arranged in series, whereby a package is minimized, and the actuator is applied as the power source of the CVVD system 100, thereby substantially improving mountability to a complex engine room due to the space occupancy minimization.

What is claimed is:

1. An actuator, comprising:
   a planetary gear set that forms a front section with an output shaft being rotated;
   a motor that forms a middle section coupled to the front section to be arranged in series with the planetary gear set and that forms a rear section with the output shaft; and
   a detector to detect a rotation angle of the output shaft behind the motor, wherein the detector includes a magnet coupled to an insert shaft and a sensor end shaft of the output shaft, and a printed circuit board assembly (PCBA) configured to detect a position of the magnet,
   wherein the front section includes a needle hearing interposed between the output shaft and the planetary gear set, and the rear section includes a rear bearing interposed between the output shaft and the motor.

2. The actuator of claim 1, wherein the front section is formed by the output shaft passing through the planetary gear set, and the middle section is formed by the motor enclosing the front section.

3. The actuator of claim 1, wherein
   the output shaft includes a shaft carrier with a connection shaft configured to output output power and the insert shaft connected to the connection shaft and that forms the front section and the sensor end shaft connected to the insert shaft and that forms the rear section separated by a carrier flange,
   the planetary gear set includes a sun gear that forms a hollow sun gear shaft with the insert shaft passing therethrough, planetary gears circumscribed about the sun gear, carrier pins that hold the planetary gears to the carrier flange, and a ring gear with the planetary gears inscribed therein, and
   the motor includes a rotor that forms the middle section by the sun gear shaft passing therethrough, a stator that encloses the rotor, and a motor housing that encloses the stator and forms both the insert shaft and the sensor end shaft.

4. The actuator of claim 3, wherein a length of the insert shaft and the sensor end shaft are greater than a length of the sun gear shaft.

5. The actuator of claim 3, wherein the insert shaft forms the front section by passing through the sun gear shaft, and the sensor end shaft forms the rear section, along with an end boss that protrudes on a side of the motor housing, over the front section, and locks the magnet.

6. The actuator of claim 5, wherein the needle bearing is interposed between the insert shaft and the sun gear shaft, and the rear bearing is interposed between the sensor end shaft and the end boss.

7. The actuator of claim 5, wherein the magnet is fitted in the sensor end shaft.

8. The actuator of claim 5, wherein the magnet is in a form of an annular magnet.

9. The actuator of claim 3, wherein the shaft carrier passes through a housing bracket, the ring gear is coupled to the housing bracket, and the motor housing is coupled to a housing cover.

10. The actuator of claim 9, wherein the housing bracket is formed with a double-stepped surface with the carrier flange and a front bearing respectively disposed thereon, and the front bearing supports the connection shaft exiting via a shaft bore of the housing bracket.

11. The actuator of claim 9, wherein the housing cover is formed with an inner space with a position sensor and the PCBA disposed therein.

12. A continuously variable valve duration system, configured to perform a motion in an start shaft position and an end shaft position using the actuator of claim 1 as a power source.

13. A continuously variable valve duration system, comprising:
   an actuator including an output shaft being rotated, a planetary gear set that forms a front section with the output shaft being an insert shaft and a sensor end shaft, a motor coupled to the front section of the planetary gear set to be disposed behind the planetary gear set, a detector to detect a rotation angle of the output shaft behind the motor, wherein the detector includes a magnet coupled to the insert shaft and a printed circuit board assembly (PCBA) configured to detect a position of the magnet, a housing bracket with the output shaft that passes therethrough and the planetary gear set coupled thereto, and a housing cover coupled to the motor to accommodate the detector;
   a control shaft connected to the actuator, and rotated from a start shaft position to an end shaft position or from the end shaft position to the start shaft position as an operating angle of the actuator; and
   a valve lifter configured to adjust a rotational speed of a cam shaft by the control shaft moving the valve lifter.

14. The continuously variable valve duration system of claim 13, wherein the actuator is operated by an engine electronic control unit (ECU) to be a continuously variable valve duration (CVVD) actuator, and the CVVD actuator provides feedback data for adjusting an output signal of the engine ECU by detecting the operating angle.

15. The continuously variable valve duration system of claim 13, wherein the actuator is disposed extraneous to an engine head assembly.

16. A valve train system, comprising:
   a continuously variable valve duration (CVVD) system configured to adjust a rotational speed of a cam shaft by operating an actuator to be a CVVD actuator that rotates at operating angles of a a start shaft position and an end shaft position using the actuator as a power source, the actuator including an output shaft being rotated, a planetary gear set that forms a front section with the output shaft being an insert shaft and a sensor end shaft, a motor coupled to the front section of the planetary gear set to be disposed behind the planetary gear set, a detector to detect a rotation angle of the output shaft behind the motor, wherein the detector includes a magnet coupled to the insert shaft and a printed circuit board assembly (PCBA) configured to detect a position of the magnet, a housing bracket with the output shaft that passes therethrough and the planetary gear set coupled thereto, and a housing cover coupled to the motor to accommodate the detector; and a continuously variable valve timing (CVVT) system using a CVVT actuator configured to directly operate the cam shaft, as a power source.

17. The valve train system of claim 16, wherein the CVVT actuator is the actuator of the CVVD system.

* * * * *